Oct. 15, 1935.  R. E. SLADER  2,017,169
PUMP JACK
Filed April 7, 1934
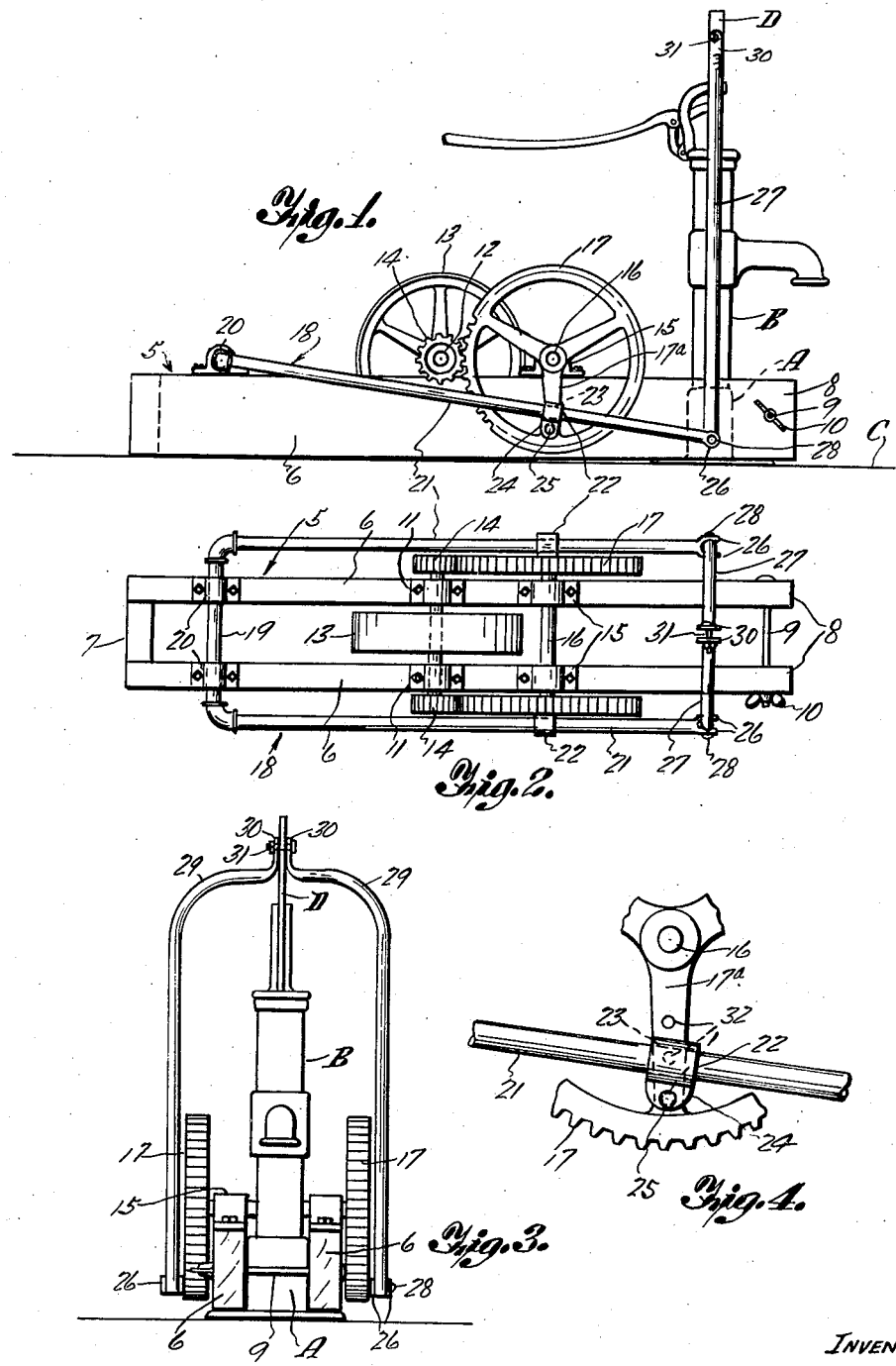
INVENTOR
Roy E. Slader
By Adam E. Fisher
ATTORNEY Patented Oct. 15, 1935

2,017,169

UNITED STATES PATENT OFFICE 2,017,169

PUMP JACK

Roy E. Slader, Fort Calhoun, Nebr.

Application April 7, 1934, Serial No. 719,474

1 Claim. (Cl. 74—45)

This invention relates to improvements in pump jacks and the main object is to provide a jack which may be readily mounted on the pump and platform and driven by a relatively small engine or motor and which will operate the pump piston rod with a vertical lifting motion saving wear on the pump as well as conserving power.

Another object is to provide a jack of this kind including a novel and efficient clamping means and base whereby it may be readily mounted and held on the pump housing, the vertical lifting action facilitating this convenient mounting arrangement.

Another object is to provide a jack including spaced base beams adapted to straddle the pump base and be pressed together thereon by a clamp bolt, the said beams carrying a power pulley driving a pair of gears through small pinions at each gear, the said gears operating a drive yoke pivoted on the frame and in turn pivoted to connecting rods running vertically upward and attached to the pump rod to operate the pump piston.

With these and other objects in view the invention resides in the novel construction and arrangement of parts as hereinafter fully set forth and claimed, reference being had to the accompanying drawing wherein:

Figure 1 is a side elevation of the jack on a pump.

Figure 2 is a plan view of the jack alone.

Figure 3 is an end view of the jack and pump.

Figure 4 is an enlarged detail of one connection between the drive yoke and gear.

In carrying out my invention I provide a base designated generally at 5 made up of two spaced parallel beams 6 joined at what is hereinafter termed their rear ends by a cross beam 7. The opposite frontal ends 8 are thus spaced freely apart and form a cleft designed to receive the base A of the usual pump B to which the beams may be tightly pressed by a clamp bolt 9 passed through the beams and provided with wing nut 10. The base is thus anchored to the pump and rests horizontally on the usual well platform C. The beams have sufficient resiliency to permit the clamping action aforesaid.

Bearings 11 are provided and fixed in axial alignment on the beams 6 at substantially a medial point thereof and a shaft 12 is journaled through the bearings and provided between the beams with a drive pulley 13 and outwardly of the bearings with drive pinions 14 all rigidly secured to the shaft. A similar pair of bearings 15 are provided on the beams forwardly of the bearings 11 and a shaft 16 is journaled therethrough carrying drive gears 17 at its outer ends meshing with the drive pinions 14.

A drive yoke 18 of U-shaped form and preferably made up from a pipe as shown is provided by its bight 19 in bearings 20 secured on the beam 6 outward and rearward from the drive pulley and gear assembly. The legs 21 of the yoke extend forwardly along the outside of the beams 6 clearing the drive gears 17 to which they are then attached by pivot or carrier bearings 22 having bores 23 freely and slidably receiving said legs 21 and ears 24 by which they are pivotally attached through bolts 25 to one spoke 17a of the gears as shown. The length of the yoke legs 21 is such that they terminate substantially in vertical alignment and immediately below the pump rod D of the pump B and at these ends the legs are forked at 26 to receive connecting rods 27 which are pivoted at 28 thereto, said rods 27 extending vertically upward to substantially the level of the top of the pump where they are bent inwardly at 29 to meet the pump rod D and then flattened and turned upward providing ears 30 pivotally bolted at 31 to the pump rod. Like the yoke 18 these connecting rods 27 are preferably fabricated from pipe.

In use any suitable engine or source of power (not shown) is belted to the pulley 13 (or geared to the gears 17) and these parts being set in rotation the legs 21 of the yoke 18 will be raised and lowered alternately causing the yoke to swing at its bight 19 in the bearings 20. The amount of this lift and fall may be varied by placing the pivot bearing bolts 25 in any of several different holes 32 formed in the drive gear spokes 17a it being understood that the pivot bearings 22 slide back and forth on the yoke legs 21 and swing by their ears 24 on the spokes as necessary. The lift and fall of the yoke legs is of course transmitted through the connecting rods 27 to the pump rod D operating the pump in usual manner.

Attention is directed to the vertical lift and operation of the connecting rod 27 brought about by the arrangement of their driving yoke 18. This arrangement operates the pump with greater ease, less wear and allows the operation efficiently with relatively small power. Also it greatly facilitates the work of mounting and connecting the jack on the platform and pump since the strain is all directly downward against the platform and to hold the jack in place it is only necessary to anchor it lightly against horizontal play on the platform here very conveniently provided by the cleft base and the clamp bolt 9. Practice has proven also that the light load and efficient operation permits the use of wood bearings throughout.

While I have herein set forth a certain preferred embodiment of my invention it is understood that I may vary from the same in minor structural details so as best to provide a practical assembly for the purposes intended, not departing from the spirit of the invention and within the scope of the appended claim.

I claim:

In a pump jack for mounting over an upright pump having a vertically reciprocable pump rod and a base portion at its ground line, a jack including a pair of spaced parallel sills adapted at one end to receive the pump base between them and being braced apart at the opposite end, means for locking the sill ends at the pump base to the base, a U-shaped drive yoke pivoted at its bight to an intermediate portion of the base remote from the pump and extending at its free ends to a point alongside the pump rod, connecting rods pivote at their lower ends to the free ends of the yoke and pivotally connected at their upper ends to the pump rod.

ROY E. SLADER.